July 26, 1966  E. L. STOCKWELL  3,262,740
TWISTING CONTROL SYSTEM FOR A TILLING DUMP VEHICLE BODY
Filed April 11, 1962  7 Sheets-Sheet 1
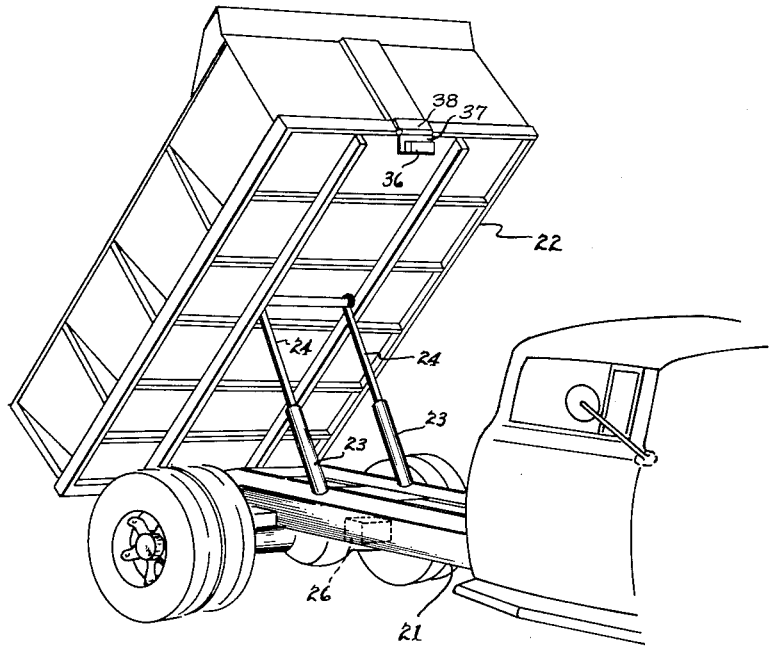
fig. 1
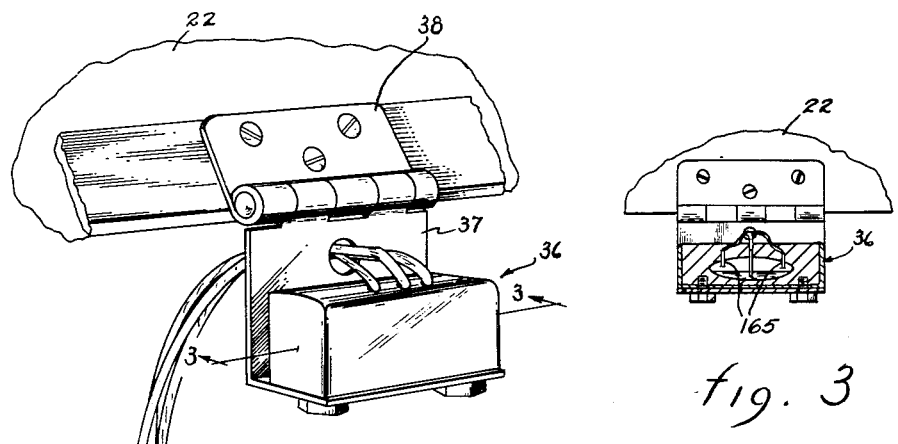
fig. 2
fig. 3
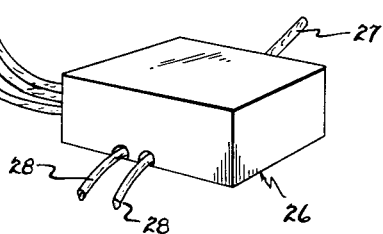
INVENTOR.
ELMER L. STOCKWELL
BY
John J. McLaughlin
ATTORNEY July 26, 1966   E. L. STOCKWELL   3,262,740
TWISTING CONTROL SYSTEM FOR A TILTING DUMP VEHICLE BODY
Filed April 11, 1962   7 Sheets-Sheet 2

INVENTOR.
ELMER L. STOCKWELL
BY
John J. McLaughlin
ATTORNEY

July 26, 1966  E. L. STOCKWELL  3,262,740
TWISTING CONTROL SYSTEM FOR A TILTING DUMP VEHICLE BODY
Filed April 11, 1962  7 Sheets-Sheet 3

INVENTOR.
ELMER L. STOCKWELL
BY
John J. McLaughlin
ATTORNEY

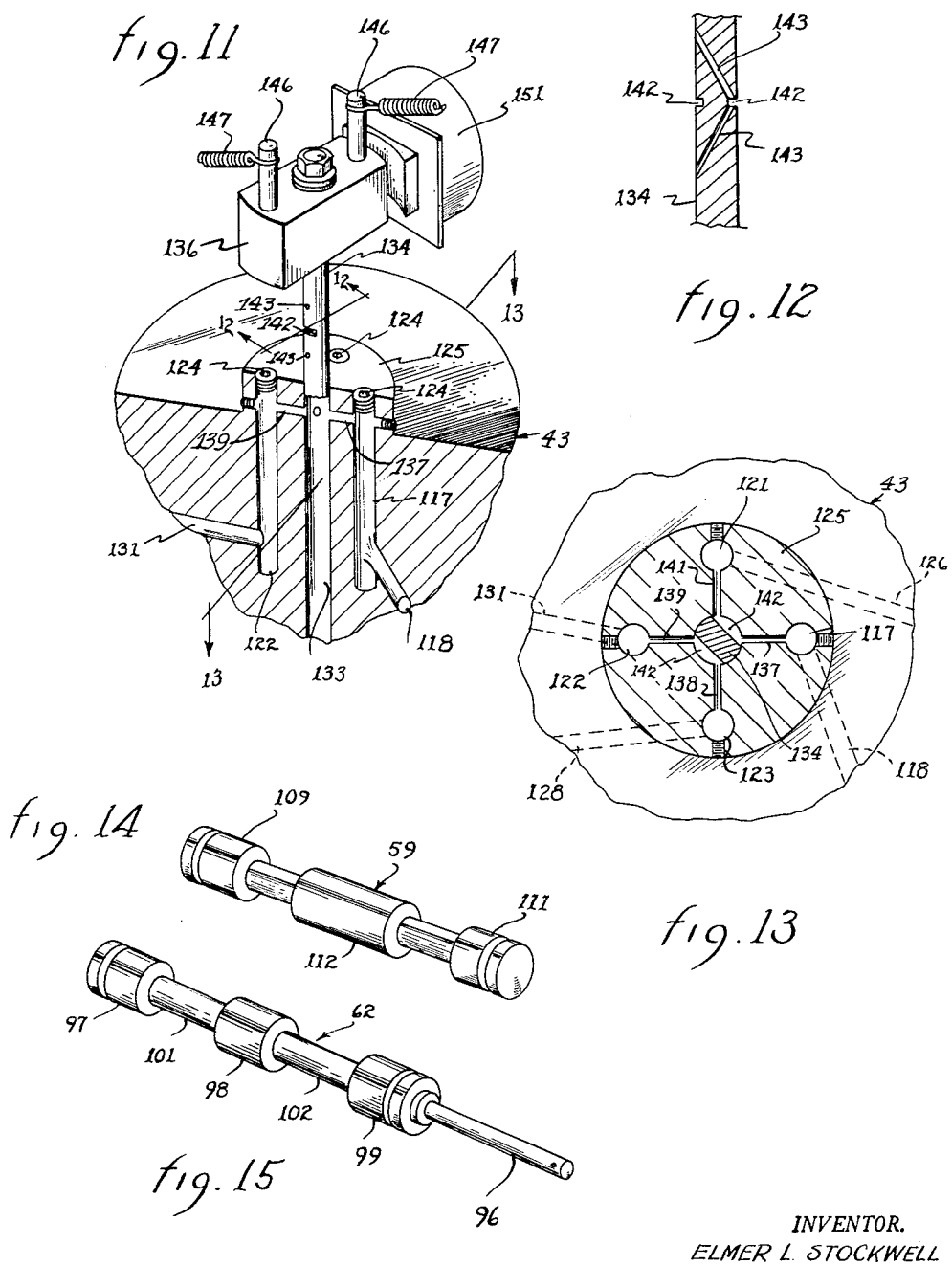

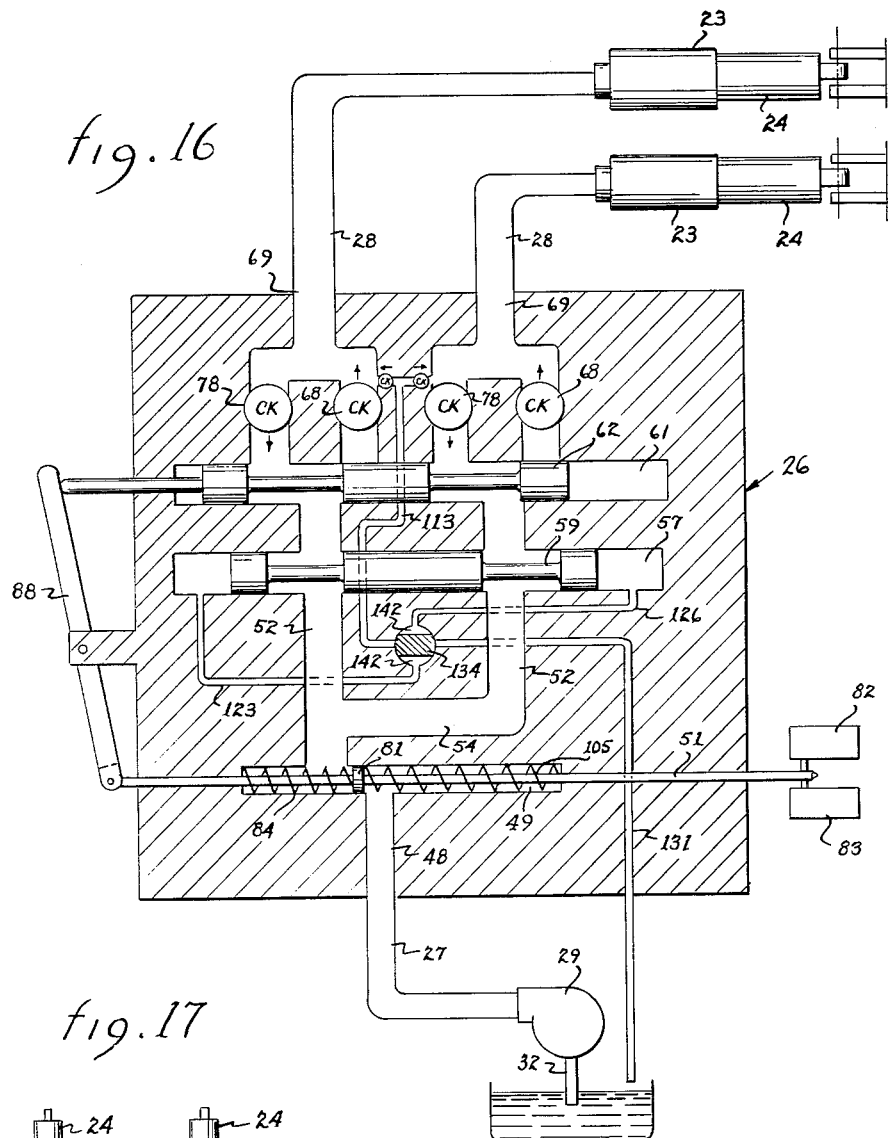

INVENTOR.
ELMER L. STOCKWELL

BY John J. McLaughlin
ATTORNEY

United States Patent Office 3,262,740
Patented July 26, 1966

3,262,740
TWISTING CONTROL SYSTEM FOR A TILTING DUMP VEHICLE BODY
Elmer L. Stockwell, Greybull, Wyo.
Filed Apr. 11, 1962, Ser. No. 186,668
12 Claims. (Cl. 298—22)

My invention relates to an improved dump truck combination and to distribution and control of hydraulic fluid in a system employing two or more hydraulic jacks or motors, such as employed in dump trucks.

The invention has primary utility in providing for the uniform operation of a plurality of hydraulic jacks employed to tilt a large dump body in either rear or side direction for the purpose of dumping a heavy load therefrom. The invention, however, may have other utility in related arts where the positive and close control of the operation of hydraulic motors of the ram type is involved.

While extensive development has occurred in the construction of large dump bodies, including mechanism intended to assure uniform lifting and lowering of the dump body, developments up to the present time have not been satisfactory, and problems in the operation of dump trucks continue to exist. The dumping of a load which is not uniformly distributed over both hydraulic jacks, or the dumping of a load when the truck is standing on a slight transverse incline will place an uneven load on the hydraulic jacks and cause them to bind in such a way that the situation can be aggravated to the extent of causing the body to dump over sideways in extreme conditions.

When two hydraulic jacks are employed, an arrangement which is very common in the art, one jack sometimes fails in operation. If the operator for any reason does not observe such failure, the good jack continues to operate with the result that the truck and equipment may be seriously damaged. None of the previously suggested means for regulating jack movement on trucks, so far as I know, provides any means for overcoming this problem. Partial or complete failure of a jack to function in the intended manner can occur when the truck body is either being raised or lowered, and suitable control during the lowering operation has not been made available.

One approach to controlled operation of a plurality of hydraulic jacks to obtain uniform non-twisting dumping movement of the dump body is to attempt to control the hydraulic fluid and deliver the same amount of fluid to each jack. Patents 2,142,089 and 2,856,232 may be considered as partially illustrative of this approach. There are several obvious reasons why such systems fail, but it is enough to point out that they fail to correct conditions resulting from complete failure of a jack to operate, or a leakage in one jack which will require more fluid delivered to it to obtain the required lift.

Still another approach to securing uniformity of dumping movement is to reinforce the pivotal connections between the moving parts, adding of bracing and reinforcing mechanism and the like. In this connection patents Re. 20,812 and 2,731,293 are illustrative, and Patent 2,113,044 may be referred to as embodying both the feature of controlling fluid flow and providing additional bracing means, particularly in the location and construction of the jacks. While there is no doubt that by the use of massive bracing members destructive twisting of a dump body can be prevented, such massive bracing does not actually correct hydraulic jack malfunction. Moreover, it adds greatly to the weight of the dump truck, and reduces the 'pay load' by almost exactly the amount of the increased weight. Thus, the pay load of a truck using my improvements may be increased by as much as fifteen hundred pounds.

There are several reasons why patented developments of the type identified have been ineffective, the principal reasons being that either they do not work or that they add so much to the cost and weight of a dump unit and introduce such other manufacturing and operating characteristics as to be unacceptable. Some systems are somewhat successful during a dumping operation but provide no control whatsoever during the return or reverse movement of the body. Hydraulic conrtol systems proposed have to a great extent been predicated on the delivery of the same amount of fluid to both hydraulic jacks, but I have found all such systems ineffective because they do not take into consideration relative pressures in various parts of the system which produce unequal flow, regardless of the fact that in theory the system is designed to deliver the same amount of fluid to both hydraulic jacks.

I am aware that many more or less precise control systems have been developed, patented and used in generally related environments, such, for example, as the control of machine elements, control of servo mechanism as in aircraft controls and the like, and that to the uninitiated it might appear to be obvious to utilize features of such systems in the hydraulic dump body field. There are several reasons why this is not the case, including the fact that frequently such devices and systems require such extreme accuracy of production, maintenance, etc., as to make them unfitted for the rugged type of application involved in the truck field. Some systems obtain control, for example, by limiting the operating speed or holding such speed constant. Such a control system would be unsatisfactory for a dump truck, because dump truck hoists must operate at slow or fast speeds, and must be able to stop and start during a dumping cycle such as when grain is being delivered to an elevator or gravel is being spread on a road. In many systems the movement involved is small and the device by its very nature cannot be modified to fit it for use on a dump body where commonly the hydraulic jacks comprise a plurality of telescoping cylinders and the total movement will be several feet.

Many devices developed and used in generally related fields employ a closed hydraulic fluid system with a fixed capacity cylinder and with fluid provided on both sides of the actuating piston so that there is a positive drive in both directions. Frequently the control of such systems is in response to idling fluid being expelled from the opposite side of a piston during a pressure stroke and is not controlled by the relative positions of two bodies, nor by the movement of the hydraulic fluid under pressure, nor by the employment of any principle which would be applicable to a hydraulic jack in which fluid must be delivered at only one end and usually discharged by the weight of the truck body during downward movement thereof.

The principal object of my invention is the provision of an improved hydraulic fluid distribution and control system particularly adapted for use on dump trucks, but having general utility in the arts relating to hydraulic fluid control to a pair of hydraulic motors.

Another object is the provision of an improved dump truck characterized by uniform body movement without twisting on both the up and down movements, and in which the elimination of twisting is not accomplished by mechanical bracing and the like structures.

Another object is to control delivery of hydraulic fluid to a pair of hydraulic motors in such a manner as to accomplish equal travel of such motors.

Still another object is to control the delivery of hydraulic fluid to two hydraulic motors in response to a small imbalance in the position of a member or members moved by the hydraulic motors in such a manner as to eliminate such imbalance.

A further object is the provision of control means between a pressure source and a pair of hydraulic cylinders functioning to cause uniform forward movement of pistons reciprocally supported in such cylinders and also functioning to pass the said fluid through the same control means to cause substantially uniform reverse movement of said pistons.

A further object is to control the delivery of fluid to a pair of hydraulic jacks forming a part of a dump body mechanism operating at varying speeds, under stopping and starting conditions and during raising and lowering movement of the body in such a manner as to accomplish equal travel of the said jacks through such cycle of movements.

A still further object is to provide a relatively lightweight hydraulic control unit for dump trucks with multiple dumping jacks, said unit responsive to a level sensing device, and having the effect of positively controlling the travel of said jacks to prevent twisting of the body while reducing markedly the over-all weight of the vehicle.

Still a further object is to provide a simple, light, small, independent hydraulic control unit which may be expeditiously installed on previously produced dumping units to provide control of hydraulic jack movement without replacement of the previously provided hoist equipment.

Other specific objects and features of the invention will be apparent from the following detailed description taken with the accompanying drawings, wherein:

FIG. 1 is a fragmentary perspective view showing a dump body and indicating one manner in which the present invention may be embodied in it;

FIG. 2 is a fragmentary view partly schematic showing one manner of mounting a sensing device and indicating the electrical connection between the sensing device and the fluid distribution and control unit;

FIG. 3 is a sectional view taken on the line 3—3 of FIG. 2 indicating details of the sensing device, the view being partly schematic;

FIG. 11 is a fragmentary perspective view partly in section showing details of the control valve stem;

FIG. 12 is an enlarged fragmentary view of a part of a rotatable control valve stem;

FIG. 13 is a transverse plan sectional view taken on the line 13—13 of FIG. 11 and showing the relationship of some of the control fluid passageways;

FIG. 14 is an enlarged perspective view of the level controlling slide valve;

FIG. 15 is an enlarged perspective view of the forward and reverse slide valve;

FIG. 16 is a schematic view showing the relationship of the working fluid passageways and the control fluid passageways;

FIG. 17 is a schematic view of the parts involved in the over-all system;

Figure 4:
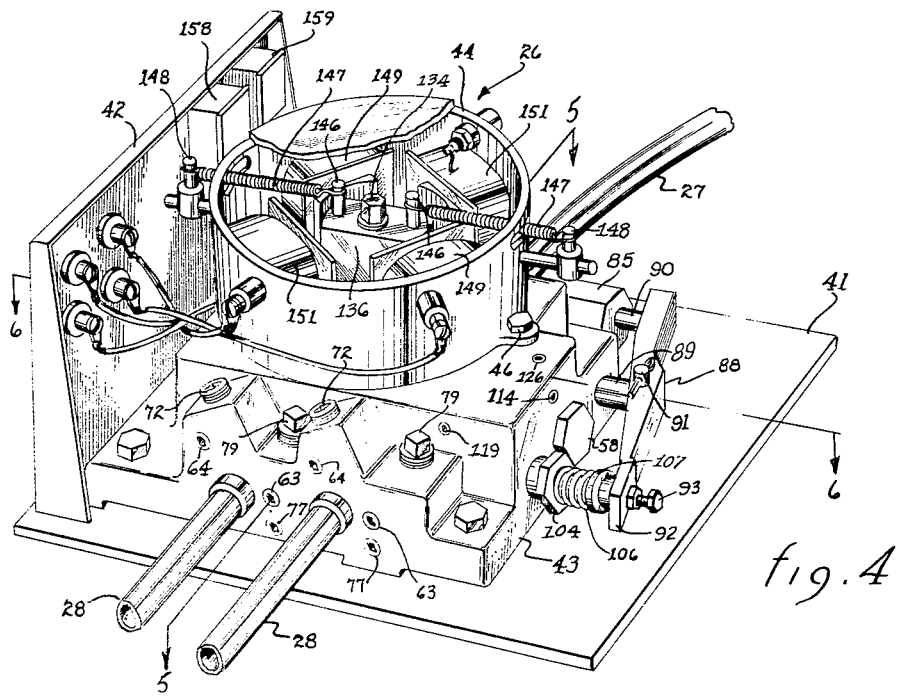
FIG. 4 is a fragmentary perspective view showing the fluid distribution and control unit with the cover removed to show details of construction.

In accordance with the general features of my invention I provide a single source of fluid under pressure and deliver it along a pair of spaced passageways in a distribution and control unit to a pair of hydraulic motors, in the case of a truck application preferably a pair of hydraulic jacks utilizing a series of telescoping cylinders for extreme longitudinal movement.

The identified passageways are branched over a part of their length to provide forward and reverse flow passageways, each preferably equipped with a check valve so that movement to and from the hydraulic motors will be functional through the same passageways. Transversely of the passageways and intercepting the passageways at right angles is a transverse controlling passageway in which a level controlling slide valve is reciprocal to valve off or completely close the passageway to either hydraulic motor. A level sensing unit actuates control mechanism including control fluid passageways to slide the level controlling slide valve in a direction to valve off fluid to the high cylinder until the imbalance has been corrected. Action of the slide valve control mechanism is extremely rapid and a cycle of movement may occur in as short a period of time as a tenth of a second.

Responsive to normal control for lowering the truck body a forward and reverse slide valve is automatically actuated in a transverse passageway intercepting the two main working fluid passageways to direct the returning working fluid and cause the full control of the levelling mechanism during downward movement of the truck body. Simultaneously with the movement of the forward and reverse slide valve the electrical circuit is modified to function suitably during the reverse movement of the working fluid, it being kept in mind that on the downward movement of the truck body the flow of fluid from the cylinder on the low side is stopped or reduced when an imbalanced condition is sensed.

In describing the invention in detail I shall first refer to the figures of the drawings showing actual structural features, and will then explain the functioning of the invention more in detail by reference to the schematic views. Throughout the same reference characters are applied to the same parts, including so far as possible the schematic representation of such parts in the schematic views. For convenience I have used the term "working fluid" to the hydraulic fluid flowing from the pressure source to the hydraulic motors; and the term "control fluid" to identify the fluid moving in the relatively small control passageways and forming a part of the control system for the working fluid. Also I have employed the term "hydraulic motor" for simplicity of expression, even though the system of the present invention has particular utility and was designed primarily for use in the dump truck field in which telescoping cylinders providing for maximum extension movement are utilized. Also for simplicity of expression I have employed the terms "forward" and "reverse" to identify the movement of the hydraulic motor and the movement of the hydraulic fluid controlling the movement of the motor. By "forward" I mean to convey the idea that the hydraulic motor is being expanded as in the raising of a truck body, and the downward movement of both the truck body and hydraulic fluid is referred to as "reverse" movement. These terms, therefore, are meant to identify any generally similar relationship of operation.

Referring now to the drawings, I show in FIG. 1 a truck having a chassis 21 and a pivotally mounted truck body 22, a pair of hydraulic jacks is provided comprising cylinders 23 pivotally supported on the chassis and rods 24 pivotally attached to the body 22. This is a partially schematic representation of any usual type of hydraulic jack adapted for use to perform the indicated function.

The truck chassis carries in any suitable position a fluid distribution and control unit indicated generally by the reference character 26 (FIGS. 2, 4 and 17). The unit 26 received hydraulic fluid under pressure from a line 27 and delivers it in a controlled manner which will be explained to a pair of delivery lines 28 running to the two cylinders 23. A hydraulic pump 29 (FIGS. 16 and 17) withdraws hydraulic fluid from a reservoir 31 through a line 32 and delivers the same to the pressure lines 27 through a three-way valve 33. On the ordinary truck this is usually a hand-operated slide valve, but the valve 33 is adequately illustrative of the control method used. Valve 33 may be turned to connect the line 27 to the line 34 to deliver return hydraulic fluid to the reservoir 31. In the standard truck system the weight of the truck body is depended upon to force the hydraulic fluid in a reverse direction and permit the body to descend, but it is understood that positive drive of the fluid in this direction is possible without departing from the scope of the present invention.

The sensing device forming a part of the system includes a usual type conventional mercury type switch 36 (FIGS. 1, 2 and 18) so constructed and designed that one of its contacts (not shown) within the mercury switch may be closed by engagement of the mercury when the switch is tilted. The mercury switch 36 is secured to a swinging plate 37 pivoted by means of a hinge to a mounting plate 38 carried on the body 22 so that if the body should tilt sideways because of uneven operation of the hydraulic jacks, the mercury switch 36 will also be tilted. The arrangement permits the swinging plate 37 to hang downwardly for proper operation of the mercury switch, but causes it to assume the same position transversely as the mounting plate 38 which, of course, is carried directly on the body 22.

Looking now particularly at FIGS. 4 through 10, reference will now be made to details of construction of the fluid distribution and control unit 26, with particular reference first to the passageways through which the working fluid moves. The unit comprises a base plate 41 on which a panel 42 is vertically mounted, this panel forming support for small electrical parts forming a part of the controlling electrical circuit. A housing as indicated schematically in FIG. 4 encloses a main body 43 to which a housing 44 is attached by means of cap screws 46, two in number, engaging in tapped holes 47 of the body (FIG. 6). The housing is apertured to pass the lines 27 and 28 as indicated also in FIG. 2.

The main body portion 43 may be formed in various ways and its construction will in general reflect the manner of its production. One suitable method is to cast or forge a steel body of suitable exterior shape and then to drill all of the required passageways. This method provides, of course, a very strong structure but requires the drilling of passageways longer than would be required functionally, and the plugging up of ends of such passageways at the surface of the body. In the embodiment of the invention shown in the drawings, the body portion is a gray iron casting and the passageways then formed by drilling. For the most part these passageways have been shown in detail, including the non-functional extensions required because of their manner of production. Those skilled in the art will understand that steel valve parts and the like to be described will slide on the cast iron surface without galling.

Referring now again to the drawings, the pressure line 27 is connected to a short longitudinally extending entrance passageway 48 terminating at a transverse passageway 49 within which a switch actuating slide rod 51 is reciprocable. The matter of supporting the slide rod 51 will be described herein below. Transverse passageway 49 communicates with a longitudinally extending main feed passageway 52, and this in turn is in communication with a second longitudinally extending main feed passageway 52 through a transverse connecting passageway 54, which is exteriorly plugged at 56. A transverse working fluid control passageway 57 (FIGS. 5 and 6) extending entirely through the main body, enclosed at its ends by plugs 58, houses a working fluid control slide valve 59 (see also FIG. 14) which participates in the level control function. Transverse passageway 57 intercepts both of the main feed passageways 52.

Figure 5:
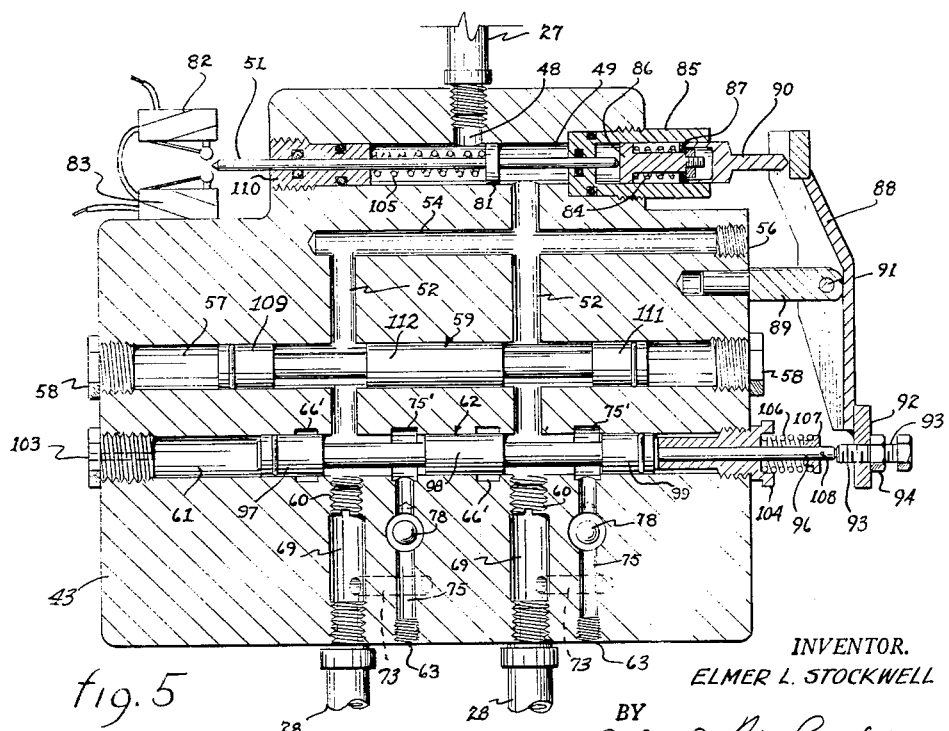
FIG. 5 is a slightly enlarged plan sectional view taken on the line 5—5 of FIG. 4.
Figure 6:
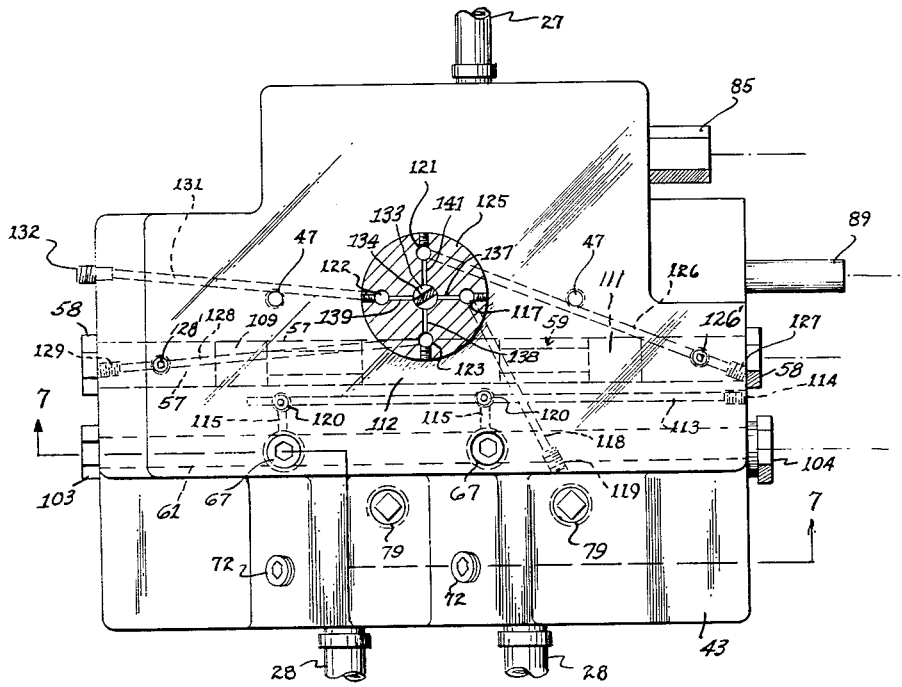
FIG. 6 is a plan sectional view taken on the line 6—6 of FIG. 4, the view being taken on a higher plane than FIG. 5.
Figure 7:
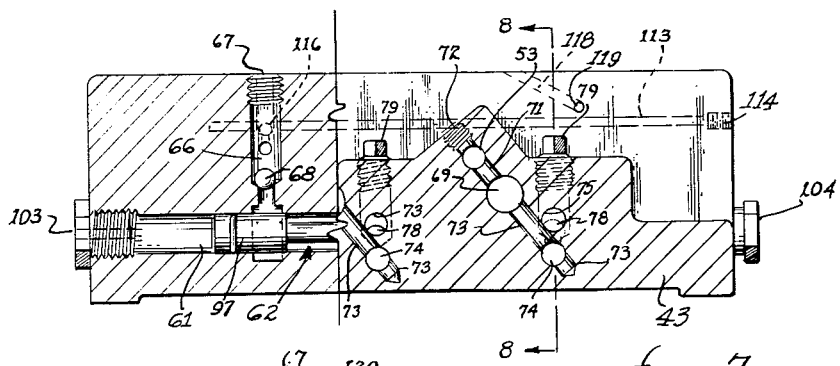
FIG. 7 is an irregular sectional view taken on the line 7—7 of FIG. 6.
Figure 8:
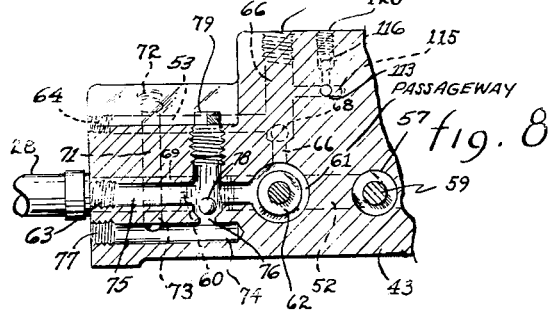
FIG. 8 is a fragmentary perspective view taken on the line 8—8 of FIG. 7.

Another transverse passageway 61 intercepting both main feed passageways 52 has reciprocally slidably supported therein a forward and reverse slide valve 62 (FIGS. 5 and 15). A further description of the structures and functions of the two slide valves 59 and 62 will be made after the path of the feed passageways 52 to the lines 28 have been traced.

Figure 9:
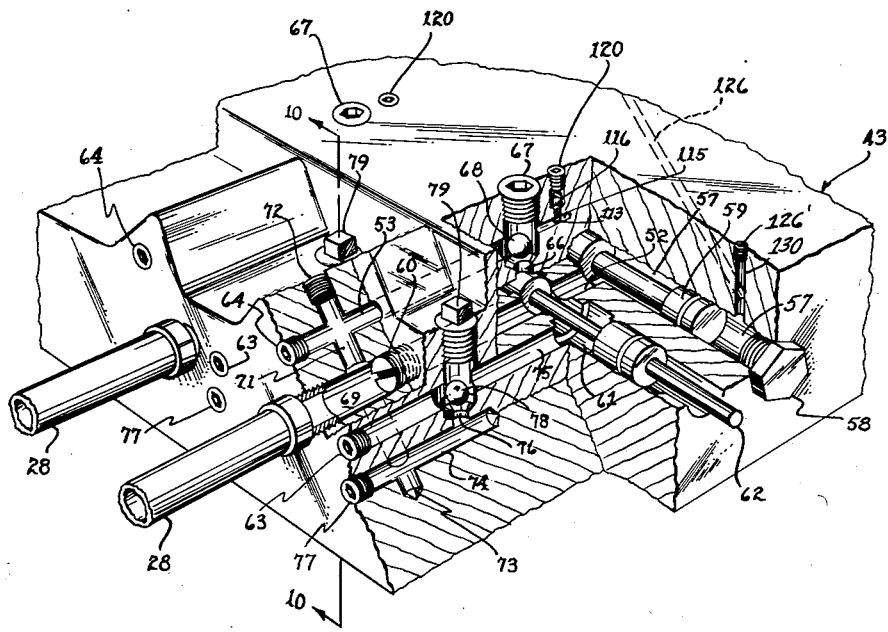
FIG. 9 is a fragmentary perspective view with the parts broken away showing the relationship of some of the passageways through which the hydraulic fluid passes and the location of the level controlling slide valve and forward and reverse slide valve.
Figure 10:
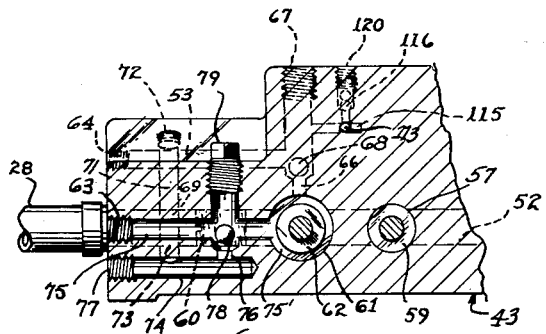
FIG. 10 is a fragmentary sectional view taken on the line 10—10 of FIG. 9.

As FIGS. 5 and 9 particularly show, the passageways 52 run to the outside of the body and are closed near their forward ends by intermediate plugs 60, forming short forward delivery passageways 69 aligned with but not directly connected to passageways 52. Above and offset from the feed passageways 52 are parallel passageways 53, which also extend to the forward face of the body 43 and are closed by plugs 64. Short vertical passageways 66 provide a communication between the transverse passageway 61 which, of course, is in communication with the feed passageways 52 and the parallel but offset supplemental feed passageways 53. Passageways 66 also extend to the exterior of the body portion 43 and these passageways are closed at their top ends by plugs 67. Ball checks 68 are positioned in the passageways 66 and are provided with a seat so related to the ball checks 68 that fluid may move upwardly from feed passageways 52, through transverse passageway 61, and upwardly through vertical passageways 66, but not in a reverse direction.

The insertion of plugs 60 results in the formation of separate short forward delivery passageways 69 (FIG. 5) with which the delivery lines 28 are in communication, and the supplemental feed passageways 53 are connected to the short forward passageways 69 by slanting passageways 71 closed at their upper ends by plugs 72 (FIGS. 7–10). Thus, on forward movement, except as limited by control mechanism to be described, the hydraulic fluid in its forward movement has a path through the body portion through rear passageway 48, transverse passageways 49, 54, 57 and 61, through longitudinal feed passageways 52, past the ball checks 68, forwardly in the supplemental feed passageways 53 and thence along the diagonal passageways 71 to forward passageways 69, and thence upwardly to delivery lines 28.

For reverse flow from the lines 28 to and through the line 27, some but not all of the previously described passageways are involved. From the passageways 69 the hydraulic fluid in a reverse direction flows into diagonal passageways 73 (FIG. 9) which are in fact continuations of passageways 71, and thence into a relatively short longitudinal passageway 74 communicating with short vertical passageways 76 leading to parallel return passageways 75 (FIG. 9). The passageways 74 and 75 are closed at their forward ends by plugs 77 and 63 respectively. Passageway 74 is blind at its rear end as shown particularly in FIGS. 9 and 10, while passageway 17 is connected at its rear end to passageway 61 as shown clearly by reference to FIGS. 5, 8, 9 and 10. Ball checks 78 are provided in the vertical passageways 76 with suitable seats and so constructed and arranged that liquid may move upwardly from passageways 74 through passageways 75 and into the feed passageway 52 through transverse passageway 61; but cannot move against the ball check in a downward direction. The vertical passageways 76 extend to the upper surface of the body 43 and are closed by plugs 79. Thus, when hydraulic fluid is being forced through the line 27, as when a truck body is being raised, the movement of hydraulic fluid from the transverse passageway 54 is through the longitudinal feed passageways 52 into the transverse passageway 61 upwardly through the vertical passageways 66 past the check valves 68 along the passageways 53 to bypass the plugs 60 and downwardly at an angle through the passageways 71 into the longitudinal passageways 69 and thence to the outlets or delivery lines 28 running to the two cylinders 23. On the return, movement is downwardly through the extension 73 of the passageways 71 (check valves 70 being forced against their seats) into the passageways 74 past the ball checks 78 into the passageways 75 and thence back through passageways 62 to the main feed passageways 52. On both the forward and return trip of the hydraulic fluid, a control is exercised as will be described.

Switch actuating slide rod 51 has a small piston 81 (FIG. 5) intermediate its ends which causes the rod to be moved in either direction by hydraulic pressure, as will be explained. In the position shown in FIG. 5 the rod 51 is not engaged between the actuating arms of a pair of micro switches 82 and 83 (for comparison see FIGS. 16 and 18). When fluid under pressure enters passageway 48, however, the piston 81 is moved to the right (FIG. 5) under hydraulic pressure carrying with it but not initially compressing the spring 84 which is disposed between plungers 86 and 87 slidably supported in a locking nut 85, threaded into the main body portion 43 and aligned with the passageway 49. The locking nut 85 seals the slide rod 51 against loss of fluid. A cap 90 extends beyond the body portion of the plunger 87 and engages a bell crank lever 88 pivoted to pin 89 at 91. The opposite end of the bell crank lever 88 has an offset projection 92 in which an actuating pin 93 is adjustably threaded and held in position by a lock nut 94. The actuating pin 93 engages the projecting end 96 of the slide valve 62.

As shown particularly in FIG. 15, the slide valve 62 comprises, in addition to the narrow projecting rod portion 96, valve bodies 97, 98 and 99 with reduced diameter portions 101 and 102 between them (see FIG. 15). The slide valve 62, as already pointed out, is slidably supported in the transverse passageway 61 which is closed at one end by a threaded plug 103. At the opposite end it is closed by a specially designed apertured plug 104 through which the rod portion 96 extends. A recessed head on the special plug 104 positions a compression spring 106 which is engaged at its opposite end by a retainer 107 held in place by a pin 108. Thus, the slide valve 62 is normally held in a right hand position, looking at FIG. 5, by the spring 106 but is adapted to be moved in a left hand direction in response to activation of the bell crank lever 88 by sliding movement of the rod 51, it being understood that spring 84 is stronger than spring 106, and the latter is compressed without appreciable compression of spring 84.

In its right hand position as shown in FIG. 5 the slide valve 62 closes off the vertical passageways 66 to prevent upward movement of fluid past the ball checks 68 and into the passageways 53. It may be noted that communicating with the passageways 66 (see FIGS. 5 and 9) are annular recesses 66′ surrounding the transverse passageway 61. Similarly, annular recesses 75′ are provided where passageways 75 intercept the transverse passageway 75. These annular recesses provide for full communication with the passageway involved and for the free sliding under pressure, without binding, of the valve 62. When the valve 62 is moved to the left, annular recesses 75′ are bridged, and passageways 75 are closed off. This arrangement thereby provides for movement in either direction through feed passageways, and at all times there is a check valve in the line to hold the hydraulic jacks in any position to which they have been adjusted. It should be noted that at each extreme position of the slide valve 62 (see FIGS. 5 and 15), the center valve body 98 and one of the end valve bodies (97 or 99) act as closure members, but at each such position the reduced diameter portions 101 and 102 are positioned to provide for unrestricted flow through the passageways not sealed off. The valve bodies 97 and 99 (see FIGS. 5 and 15) at all positions seal the passageway 61 against loss of fluid. The valve bodies 97 and 99 are adapted because of the annular grooves shown in FIG. 15, to receive O-rings or other packing media to seal the passageway 61.

When fluid under pressure enters the passageway 48 and the piston 81 is moved partially in a right hand direction to move the slide valve 62 in a left hand direction (FIG. 5) the vertical passageways 66 by hydraulic pressure against the ball check valves 68 are closed before the rod 51 has worked the limit of its travel. Further movement of the rod 51 by force of the incoming fluid against the piston 81 compresses spring 84 and fully uncovers the opening between passageway 49 and the main feed passageway 52. When fluid movement is in a reverse direction during downward movement of the truck body 22, rod 51 will first be moved to the left (FIG. 5) by spring 84, and slide valve 62 will then be moved to the right by spring 106 carrying rod 51 further to the right. The fluid moving in reverse through the unit then forces the piston 81 further to the left to fully open passageway 48. This movement compresses spring 105 which is disposed between the piston 81 and a sealing plug 110.

The control fluid passageways comprise a separate system in communication with a source of fluid under pressure, and functioning to control the position of slide valve 59. This slide valve is symmetrical, as shown in FIG. 14, and contains two end portions 109 and 111 which fit passageway 57 snugly and are provided with O-rings to avoid leakage. A middle valve portion 112 also fits the passageway 57 snugly and is adapted to lie between the two passageways 52, as shown in FIG. 5, but during normal operation will usually be moved to the left or right to either valve off or completely close one of the passageways 52. Slide valve 59 is controlled in its movement by control fluid carried in the system of control passageways referred to.

A transverse passageway 113 (FIGS. 6–11) is provided in the body portion 43 at a position above that of the working fluid passageways shown in FIG. 5. Control passageway 113 is closed at its exterior end by a plug 114 but is always in communication with working fluid under pressure to provide for control of the position of slide valve 62. Short longitudinal passageways 115 forming in effect continuations of passageways 53 communicate with passageways 66 above the check valves 68, and passageways 115 are in turn in communication with short vertical passageways containing ball checks 116 and closed by exterior plugs 120. Thus, during forward flow of hydraulic working fluid through vertical passageways 66 and longitudinal passageways 53, there is a direct supply of fluid under pressure against ball checks 116 and into passageway 113. On reverse flow there is working fluid pressure in passageways 53, even though ball checks 68 are closed and annular passageways 66′ are closed by slide valve 62. During periods of no flow, and when the unit is shifting from forward to reverse flow, ball checks 116 hold the control fluid in passageway 113 against leakage.

Passageways 113 is then placed in communication with a vertical passageway 117 (FIGS. 6, 11 and 13) through a diagonal passageway 118 drilled through the forward face of the body portion and closed by a plug 119. As shown particularly in FIGS. 11 and 13, vertical passageway 117 extends downwardly into the body portion and through an annular upper projection 125. There are four uniformly positioned vertical passageways including such passageway 117 and additional passageways 121, 122 and 123, all of such vertical passageways being formed by drilling downwardly substantially vertically through the projection 125 and into the body portion 43. All such holes are closed at the top by plugs 124.

Vertical passageway 121 is in comunication with the right hand side of passsageway 57 through a diagonal passageway 126 drilled through the body portion from the side and closed at its exterior end by a plug 127 (see FIGS. 6 and 13). Similarly, vertical opening 123 is in communication with the left end of transverse passageway 57 through a diagonal passageway 128, the exterior end of passageway 128 being closed by a plug 129. In each instance the diagonal passageway 126 or 128 as the case may be, is drilled through the side wall of the passageway 57 to the vertical holes (121 or 123 as the case may be) to which they are connected. The plugs 127 and 129 are then applied exteriorly of the body to close the holes leading to and through passageway 57. In a generally similar manner, vertical passageway 122 is placed in communication with a diagonal passageway 131 which extends to the outside of the body portion and connects with a fitting 132 through which this passageway may be connected back to the reservoir 31 (FIGS. 16 and 17). As shown particularly in FIG. 9, a vertical passageway 130 is drilled through the diagonal passageway 126 into the right-hand side of passageway 57, and the passageway 130 is closed at its top by a plug 126'. A similar vertical passageway (not shown) connects the diagonal passageway 128 to the left-hand side of passageway 57 and this passageway is closed by a stop plug 128'. The relationship of these two vertical passageways may be determined by reference to FIG. 6 where both of the plugs 126' and 128' are shown.

There is also a vertical opening 133 centrally of the projection 125 which carries a valve stem 134 depending from an armature 136, the functioning of which will be explained later. Between the four equally spaced vertical passageways described (117, 121, 122 and 123) and the central opening 133 are four radial ports 137, 138, 139 and 141. The valve stem 134 has a pair of oppositely faced kerfs 142 (FIGS. 11, 12 and 13) cut part way through the valve stem and forming a pair of valve ports, such as indicated in FIGS. 6 and 13, by means of which the radial passageways can be placed in communication with each other. The valve stem also has a pair of drilled ports 143 which extend from kerf 142 to the opposite side of the valve stem to equalize pressures and permit the valve stem to be rotated freely. By a study of the passageways and valve mechanism described it will be apparent that when the valve stem is in the position shown in FIG. 13 the radial passageways 137 and 141 will be in communication and control fluid under pressure will be introduced to the right hand side of the slide valve 59, thereby partially or completely closing the left hand passageway 52 as viewed in FIG. 5. At this time radial passageways 138 and 139 are also in communication and fluid in the left end of transverse passageway 57 can pass out through the series of passageways through fitting 132 and be bled from the control system. If now the valve stem is moved to an opposite position placing radial passageways 137 and 138 in communication, the opposite result will occur. Slide valve 59 will move to the right in FIG. 5 and the right hand passageway 52 will be closed.

Preferably, the system of the present invention is controlled by electrical and electro-mechanical means of which the armature 136 carrying the valve stem 134 forms a part. As seen particularly in FIG. 4 and also indicated in part in FIG. 11, the armature 136 carries a pair of upwardly projecting posts 146 to which positioning tension springs 147 are connected, the opposite ends of the positioning springs 147 being connected to pins 148 carried on projections from the housing 44. Two pairs of solenoids or electromagnets 149 and 151 are supported within the housing 44 in axial relation to the center of rotation of the armature 136, so that when one set of solenoids is energized the armature will line up in alignment therewith, and when the other set is energized the alignment will be in the opposite quadrant. When none of the solenoids is energized the springs 147 hold the armature and valve stem 134 in neutral position, as shown in FIG. 4.

While the general wiring arrangement is shown in part in FIG. 4 and other figures of the drawings, reference to the schematic diagram in FIG. 18 will be made for a more complete disclosure of electrical function. Here a battery 152 grounded at one side at 153 and at the opposite side connected through a conductor 154 and cross-conductor 156 to a pair of arms 157 forming a part of electromagnetic relays 158 and 159. These relays are shown mounted on the panel 42 in FIG. 4. The two relays have solenoid coils 161. The two micro switches are shown in this figure as closed against contacts 162 and 163, contacts 164 and 166 being open. If now the mercoid switch 36 should be tilted to the left, a circuit will be established including conductor 167. This circuit will also then include conductor 168 and coil 161 of relay 159. This will then draw arm 157 to switch contact 169, thus establishing a circuit including the battery 152, the conductor 154, and the electro-magnets 149. If the tilt of the mercury switch is to the right, then a circuit will be established including conductor 171, contact 163, conductor 172 and the coil of relay 158, with the result that the electro-magnets 151 will be energized. Thus, the armature 136 will be placed in position to cause control fluid under pressure to move the slide valve 59 in either direction. Further explanation of the control of this movement and the functioning of the entire system will be made.

Figure 18:
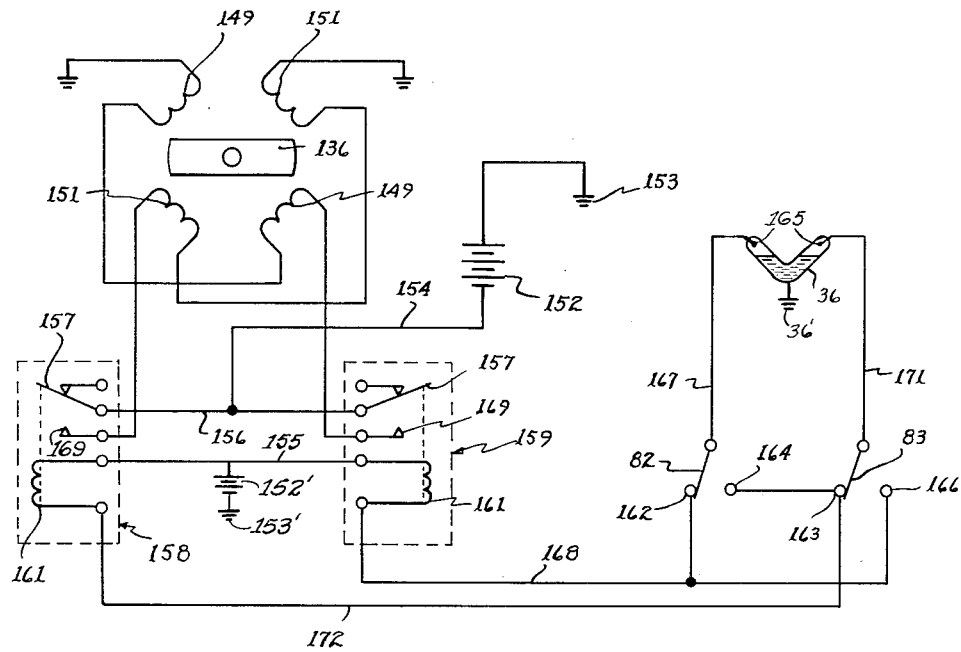
FIG. 18 is a schematic of the electrical control circuit including the forward and reverse micro switches, the armature controlling the position of the rotatable fluid control valve and the level sensing unit, in this embodiment a mercury switch.

It should be noted that FIG. 18, for convenience, shows only a single power source in a form of battery 152, although it is common practice to employ control or signal voltage with mercury switches, and power voltage when significant electro-magnetic power is required. When two types of power are used, the signal or control voltage normally operates a servorelay to control the power circuit. Such systems are so common and well-known, however, that I have assumed it to be unnecessary to illustrate a complex circuit of a type common to all electrical engineers and available in all handbooks.

Still considering the schematics, it may be assumed that the micro switches 82 and 83 are in the position shown in FIGS. 5 and 16. This position is brought about by the slide rod 51 being at its left, such as when the small piston 81 has been moved by pressure fluid to open up a communication to passageway 52. If now the hydraulic fluid movement is in the reverse direction, then the piston 81 will be moved to the left by the returning fluid to uncover the passageway 48, and the slide rod 51 will then engage between the switch arms to reverse the position of the two double-through micro switches 82 and 83. This will cause the microswitches 82 and 83 to engage the contacts 164 and 166 respectively, and the action of the mercury switch in energizing one set of electro-magnets or the other will just be the reverse of that described.

The functioning of the device of the present invention may be explained relatively simply by reference to the schematic hydraulic diagram of FIG. 16 and the wiring diagram of FIG. 18. In considering FIG. 16, it should be kept in mind that as a schematic view it is somewhat simplified as compared to FIG. 5, for example. If, however, FIG. 5 should be turned upside down the relationship of the parts in the two views will be more apparent. Assuming that the valve 33 is turned to a position to deliver fluid from the pump 29 to the line 27, hydraulic fluid under pressure will enter the distribution and control unit at 48. This introduction of fluid under pressure will push the piston 81 to the left looking at FIG. 16, but to the right looking at FIG. 5. Rod 51 is moved to disengage the two switches 82 and 83 to establish a circuit condition for proper control through the FIG. 18 circuit during the forward movement of the fluid during which the truck body is raised. When the rod 51 is so moved, lever 88 engages the projecting end of slide valve 62 and closes the two passageways 75 at 75' (FIG. 5). This permits hydraulic fluid under pressure to pass the check valves 68 into passageways 53 and down passageways 71 to passageways 69 and thence to lines 28. This action moves the pistons 24 to the right, looking at FIG. 16. During this movement which may be slow or fast, the delivery of hydraulic fluid may be stopped at any time and the check valves 68 will hold the dump body to any position to which it has been raised.

If for any reason during the upward movement of the truck body there should be more resistance against one piston than the other caused by any intervening circumstance, such, for example, as an uneven load, the piston encountering a greater resistance will lag slightly and this will cause the mercury switch to close against the low side and activate the electromagnetic armature 136 through the circuitry shown in FIG. 18 to move the slide valve 59 in a direction to limit or totally eliminate delivery of fluid to the cylinder on the high side. This is accomplished as previously described by the armature 136 becoming aligned with one set of magnets or the other, depending upon the circuit established, and moving the valve stem 134 so that the saw kerfs 142 will establish communication between the pressure line 113 and either the line 121 on the line 123 leading to one of the two ends of the transverse passageway 57, depending upon the cylinder which has lagged behind.

While in actual practice I may control the slide valve 59 to either fully or partially close the passageways leading to one of the cylinders 23, I have found that it is preferable to close the passageway off completely and to deliver hydraulic fluid only to the piston which is lagging. This very quickly overcomes the imbalance and normally establishes a small imbalance in the opposite direction to cause the position of the slide valve 59 to be sharply reversed. When this process is going on the movement of the valve 59 is very rapid, going through a cycle in as short a time as a tenth of a second. This means that in actual practice a device such as a dump body may be moved up smoothly and uniformly as if there was actually a continuous but precisely controlled flow to each of the two cylinders. It should be apparent that to accomplish this result the sensing mechanism used should be accurate and sensitive. It should be remembered that even in such a relatively non-precise operation as dumping of a truck, the truck will actually be stationary as a rule during the dumping operation and quite precise control is possible.

When the valve 33 is turned in a direction to permit return movement of the truck body, pressure is immediately relieved on the left side (FIG. 5) of the small piston 81, and this permits spring 106 to return the entire assembly to substantially the position shown in FIG. 5. Since slide valve 62 is also involved in this, the passageways 66 are closed and passageways 75 are opened. This permits hydraulic fluid moved in a reverse direction by the weight of the truck body to flow through passageways 73, past ball checks 78, into passageways 52 and back through line 27 into the reservoir. When fluid thus passes the ball checks into passageways 52 it enters transverse passageway 49 and moves piston 81 in a direction to compress spring 105, to open passageway 48 fully, and to positively activate switches 82 and 83. This action engages contacts 164 and 166 (FIG. 18) and preconditions the circuit for operation of the unit 26 in a reverse direction. The mechanism functions during the reverse movement of the fluid, therefore, in the same general manner as when the fluid is moving forwardly to keep the truck body level. Thus, the slide valve 59 will be moved back and forth in the same general manner as previously, except that it will cut off flow of fluid from the lowermost cylinder so that the uppermost cylinder can catch up with it and establish equilibrium. This opposite effect is brought about through actuation of the two micro switches 82 and 83 to engage the contacts 164 and 166 establishing a circuit producing the opposite effect in the movement of the armature as that previously described. In other words, with the parts in the position shown in FIG. 18, tilting of the mercury switch to the left will cause the electromagnets 149 to be energized. If, on the other hand, the micro switches 82 and 83 have been actuated by the rod 51 in the manner described, tilting of the mercury switch to the left will have the effect of activating relay 158 and energizing electro-magnets 151. While battery 152 may be employed to control both the circuits including the coils 161 and electromagnets 149 and 151, I show a second battery 152' with one side connected to conductor 155, and one side to ground at 153'. Neither of the contacts 165 of the mercury switch 36 is engaged, so that the armature 136 is in neutral position. The mercury switch 36 is also provided with a ground 36'.

Figure 19:
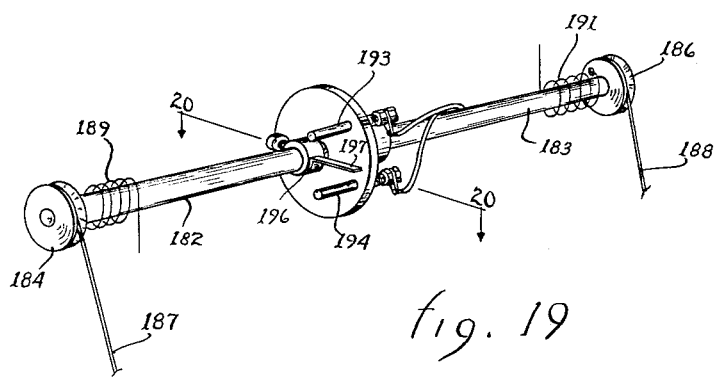
FIG. 19 is a perspective view of another form of level sensing device.
Figure 20:
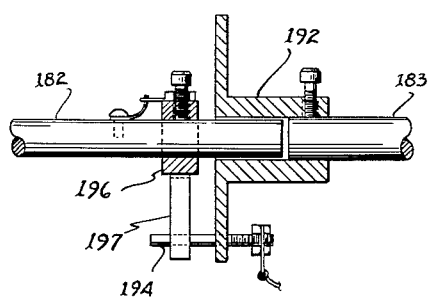
FIG. 20 is a fragmentary sectional view taken on the line 20—20 of FIG. 19.

The sensing device employed may vary, and I show in FIGS. 19 and 20 one such modification in which a pair of suitably supported and journalled shafts 182 and 183 are carried in end to end relation. The shafts carry spools 184 and 186 on which are wound strands 187 and 188. The shafts are spring pressed to rotate in the same direction so as to wind the strands 187 and 188 by suitable coil springs 189 and 191. The shaft 183 carries a hub 192 on which are two projecting pins 193 and 194 projecting axially of the shafts but in spaced relation thereto and to each other. A second hub 196 secured on shaft 182 carries a radially projecting blade 197. The pins 193 and 194 and the blade 197 are suitably connected into the circuit in the same general manner as the mercoid switch switch previously described. The device of FIGS. 19 and 20 is suitably mounted so that the shafts 182 and 183 are functionally supported by the body, for example, and the strands 187 and 188 secured, for example, to the chassis. When the two shafts turn together no circuit will be established, but when one shaft starts to over-run the other, contact is made which can be utilized to establish a controlling circuit having the same general relationship to the controlling apparatus as the circuit shown in FIG. 18.

The sensitivity of the sensing device shown in FIG. 19 can be controlled by the relative position of the two contact pins 193 and 194. An unusually sensitive device may be produced by placing these pins very close together.

The embodiment of the invention shown in the drawings and described hereinabove has exhibited very satisfactory results for its intended purpose, and a truck such as indicated in FIG. 1 utilizing the device of the present invention has very desirable control and dumping characteristics. While it is, of course, desirable that a load be dumped from as flat a surface as possible particularly so far as a transverse slope is concerned, I have found that a truck embodying the present invention dumps very satisfactorily on a grade which is not too steep transversely. What actually happens is that there will be a slight twisting to bring the truck body to level position, even though the chassis is not entirely level, and thereafter the level condition of the body will be maintained. With all other types of imbalance such as that produced by an unequally distributed load, the results, of course, are completely satisfactory.

The sensing device employed may take many forms as long as it can supply a reference point or points from which a desired relationship and/or an imbalanced relationship may be sensed. Various gyroscopic devices, for example, may be employed with only minor changes in the relationship of parts.

A very significant aspect of my invention is controlling the level movement of the truck body on both the way up and on the way down. Some devices heretofore suggested at times do a reasonably satisfactory job in maintaining a level condition as the dump body is raised, but none, so far as I know, combines with an effective forward movement control an equally satisfactory down movement control. I wish to point out that while there are very many advantages in controlling the hydraulic fluid entirely within the unit, as by securing flow in the passageways as shown by the arrows in FIG. 16, it is possible also, using my improved control features, to automatically shift or functionally interchange the two lines 28, and in this condition the required reversal of the controls will be obtained, and the unit will then perform equally well in controlling jack operation on both the forward or power stroke and the reverse or down stroke.

I referred hereinabove to the use of a plurality of jacks in the sense of more than two. On very large dump bodies three or more hydraulic jacks are frequently used. The exact manner in which the control system of my present invention is used depends to a considerable extent on the particular installation. In instances where there are three jacks, for example, one in the center and one at each side, I may obtain good results by providing for the middle jack only the usual conventional controls, and apply the present system for the precise control of the action of the outside jacks.

A significant feature of my invention is that while all systems and mechanisms heretofore proposed for effective control of jack operation require extensive changes and replacement of parts in changing over an already existing truck, the system of the present invention may be expeditiously and simply installed on an existing dump truck already in use, without replacement of any of the hoist equipment. In other words, the equipment of my invention may be used on new equipment or as an accessory for use on existing equipment, and in both instances the same kind of precise control is obtained.

Normally, weight cannot be reduced when an installation is made on existing equipment, although the added weight of the equipment is extremely small from a percentage standpoint. When my system is employed on new equipment, however, it may be lightened in many ways. An ordinary dump truck with two jacks, for example, may be lightened by as much as fifteen hundred pounds, with, of course, a corresponding increase in payload.

While the embodiment of the present invention has proved very satisfactory in actual practice, it should at once be apparent that the features of the present invention may be embodied in accordance with many modifications without departing from the spirit and scope of the present invention. It is my purpose, therefore, not to be limited by the above details shown and described. The scope of the invention is defined by the claims.

I claim:
1. In a dump truck combination,
 (a) a truck chassis,
 (b) a tilting body pivotally secured on said chassis,
 (c) at least two hydraulic jacks connected between the chassis and truck body to raise or lower the latter about said pivot in a dumping action,
 (d) a fluid distribution and control unit,
 (e) a source of fluid under pressure,
 (f) valve means controlling flow of fluid from said source to said fluid and distribution unit and for returning said fluid to said source,
 (g) hydraulic lines connected to deliver fluid from said unit to each of said jacks,
 (h) a single passageway within the unit receiving fluid from said source when said valve means is opened,
 (i) connecting feed passageways in said unit for delivering the same to said hydraulic lines,
 (j) a sensing device mounted on said tilting body responsive to unequal longitudinal travel of said hydraulic jacks,
 (k) means within the unit and responsive to said sensing device for delivering such amounts of fluid to said connecting passageways and to the said jacks as to cause equal longitudinal travel of the jacks during the raising or lowering of the tilting body,
 (l) means responsive to flow of hydraulic fluid through said fluid distribution and control unit for reversing said controlling action, said last-mentioned means continuing to be responsive to said sensing device as said fluid flow is reversed.

2. The combination defined in claim 1, wherein said feed passageways include:
 (a) a pair of sections with check valves passing fluid in a forward direction,
 (b) a pair of sections passing fluid in a reverse direction, and including
 (c) a forward and reverse control transverse passageway intersecting said forward and reverse passageway sections,
 (d) a forward and reverse slide valve in said slide valve in a direction to close said reverse liquid passageway sections when fluid under pressure is admitted to said unit to raise the dump body by longitudinal movement of said jacks, and
 (e) means for automatically moving said forward and reverse slide valve in a direction to close the forward passageway sections and open the reverse passageway sections.

3. The combination defined in claim 1 including,
 (a) means forming a transverse working fluid control passageway intercepting said pair of feed passageways,
 (b) a working fluid control slide valve in said passageway having a valve section disposed between said feed passageways but capable of closing either, and
 (c) means responsive to the sensing device and forming a part of said delivery control means for moving said slide valve in either direction and delivering fluid entirely to or from one jack during any interval in which imbalance of uniform longitudinal jack travel is detected by said sensing device.

4. In a dump truck combination,
 (a) a truck chassis,
 (b) a tilting body pivotally secured on said chassis,
 (c) a pair of hydraulic jacks connected between the chassis and tilting body to raise or lower the latter about said pivot in a dumping action,
 (d) a source of hydraulic fluid,
 (e) a fluid distribution and control unit having a passageway for receiving working fluid under pressure from said pressure source and two connecting feed passageways for delivering said fluid to the two hydraulic motors,
 (f) valve means controlling delivery of said fluid under pressure to said fluid and distribution unit,
 (g) a slide valve so functionally related to said two feed passageways as to interrupt fluid flow to either of such passageways,
 (h) means for delivering fluid under pressure to the receiving passageway of said control unit,
 (i) a pair of control passageways,
 (j) a sensing device mounted on the tilting body responsive to unequal longitudinal movement of said two hydraulic jacks, and
 (k) means functioning on both a power stroke and fluid displacement stroke of said hydraulic jacks and under the control of said sensing device for moving said slide valve to close off an appropriate one of said feed passageways and shut off fluid flow therein until the unequal longitudinal movement condition detected by the sensing device has been overcome in the raising or lowering of the tilting body.

5. A system as defined in claim 4 including
 (l) a rotary valve with a rotatable valve stem controlling delivery of hydraulic fluid to said slide valve,
 (m) an armature secured to said stem and normally spring biased to neutral position,
 (n) two pairs of electromagnets for actuating the armature to either of two fluid delivering positions, (o) circuit means for energizing one of said pairs of magnets during forward movement of the hydraulic fluid to stop flow of fluid through the passageway leading to the furthest advanced hydraulic motor as sensed by the sensing device, and
(p) means causing said electromagnet to be energized and the armature to move in an opposite manner during reverse movement of the hydraulic fluid resulting from fluid displacement from the hydraulic jacks to stop flow of fluid through the passageway connected to the jacks which is least advanced in the said fluid displacement direction.

6. In a dump truck combination,
(a) a truck chassis,
(b) a tilting body pivotally secured on said chassis,
(c) a pair of hydraulic jacks connected between the chassis and truck body to move the latter about said pivot in a dumping action,
(d) a source of hydraulic fluid under pressure,
(e) a fluid distribution and control unit having a passageway for receiving said fluid under pressure, two feed passageways connected to the said receiving passageway and two delivery passageways for delivering said fluid from said feed passageways to the two hydraulic jacks,
(f) valve means controlling delivery of said fluid under pressure to said fluid and distribution unit,
(g) a sensing device responsive to non-uniform operation of said hydraulic jacks,
(h) control means actuated by said sensing device for delivering fluid to only one of said feed passageways to maintain substantially uniform jack movement in both a forward and reverse direction,
(i) a pair of interconnecting passageways between the feed passageways and fluid receiving passageway, each with a check valve therein to permit forward flow of fluid to the motors but to stop reverse fluid flow from the motors,
(j) a second pair of interconnecting passageways between the feed passageways and said receiving passageway each with a check valve therein to permit fluid flow in a reverse direction from the motors but to stop forward fluid flow to said motors,
(k) means including a forward and reverse slide valve disposed between the feed passageways for limiting fluid flow to either of said pair of connecting passageways, and
(l) said slide valve means being responsive to delivery of fluid under pressure through said fluid distribution and control unit to said receiving passageways for moving said forward and reverse slide valve in a direction to open the passageway sections permitting forward fluid movement and close the passageways permitting reverse movement to equalize jack movement as the body is raised,
(m) said control means functioning automatically to deliver fluid to the low jack when the body is rising and to receive fluid from the high jack when the body is descending.

7. In a dump truck mechanism for a truck having a chassis and a dump truck pivotally supported on the chassis,
(a) a pair of hydraulic jacks pivotally disposed between the truck body and chassis for raising and lowering the same,
(b) a fluid reservoir,
(c) means providing passageways between said reservoir and jacks,
(d) a pump adapted to withdraw fluid from said reservoir and deliver the same to said jacks to raise the body,
(e) fluid pressure responsive sliding valve means functionable to deliver fluid to and from either of said jacks,
(f) manually operable valve means to deliver fluid from said pump to said jacks,
(g) electrically operated means mounted on the truck body responsive to unequal movement of said jacks to deliver fluid under pressure to said sliding valve to deliver fluid to a low jack when the body is being raised,
(h) valve means for draining fluid from said jacks and delivering the same to said reservoir to lower the body,
(i) means responsive to movement of fluid in a reverse direction during such drainage to change said electrically operated means to move said sliding valve in a direction to drain fluid from a high jack as the body is lowered, and
(j) check valves in said passageways holding the body in any adjusted position whether in the process of raising it or lowering it.

8. In a dump truck combination,
(a) a truck chassis,
(b) a tilting body pivotally secured on said chassis,
(c) a pair of hydraulic jacks connected between the chassis and truck body to move the latter about said pivot in a dumping action,
(d) a source of hydraulic fluid under pressure,
(e) a fluid distribution and control unit having a passageway for receiving fluid under pressure, two feed passageways connected to the said receiving passageways and two delivery passageways for delivering said fluid to the two hydraulic jacks,
(f) valve means controlling delivery of said fluid under pressure to said fluid and distribution unit,
(g) a sensing device responsive to non-simultaneous and co-extensive operation of said jacks,
(h) control means actuated by said sensing device for delivering fluid through said feed passageways to said delivery passageways to maintain substantially uniform movement in both a forward and reverse direction,
(i) two pairs of connecting passageways between the feed passageways and delivery passageways each with a check valve therein to permit forward flow of fluid to the jacks but to stop reverse fluid flow from the jacks through said feed passageways,
(j) automatic means opening and closing said control passageways depending upon the direction of movement of working fluid through the unit,
(k) a transverse control passageway intercepting the two feed passageways,
(l) a control slide valve in said control passageway for limiting fluid flow to one or the other said feed passageways, and
(m) solenoid operated control means actuated by said sensing device for moving said control valve to accelerate fluid flow in a feed passageway leading to the least expanded jack during a power stroke when the body is being raised and to decelerate fluid flow from the least expanded jack during a return stroke when the body is being lowered.

9. In a dump truck combination,
(a) a truck chassis,
(b) a tilting body pivotally secured on said chassis,
(c) a pair of hydraulic jacks connected between the chassis and truck body to move the latter about said pivot in a dumping action,
(d) a source of hydraulic fluid under pressure,
(e) a fluid distribution and control unit having a passageway for receiving fluid under pressure and two connecting feed passageways for delivering said fluid to the two hydraulic jacks,
(f) valve means controlling delivery of said fluid under pressure to said fluid and distribution unit,
(g) a transverse passageway intercepting said feed passageways, (h) a slide valve in said transverse passageway shaped to valve off either of said feed passageways, and
(i) solenoid operated means responsive to lateral tilting of the tilting body for moving said slide valve to stop flow in one feed passageway for correcting said lateral tilting on both upward and downward movement of said body.

10. In a dump truck combination,
(a) a truck chassis,
(b) a tilting body pivotally secured on said chassis,
(c) a pair of hydraulic jacks connected between the chassis and truck body to move the latter about said pivot in a dumping action,
(d) a source of hydraulic fluid under pressure,
(e) a fluid distribution and control unit having a passageway for receiving fluid under pressure and two connecting feed passageways for delivering said fluid to the two hydraulic jacks,
(f) valve means controlling delivery of said fluid under pressure to said fluid and distribution unit,
(g) a transverse passageway intercepting said feed passageways,
(h) a slide valve in said transverse passageway shaped to close either of said feed passageways,
(i) a sensing device positioned to sense non-uniform longitudinal positions of said jacks, and
(j) electrically operated means responsive to said sensing device for moving said slide valve to stop flow in one feed passageway until the non-uniformity has been corrected on both upward and downward movement of said body.

11. In a dump truck combination,
(a) a truck chassis,
(b) a tilting body pivotally secured on said chassis,
(c) a pair of hydraulic jacks connected between the chassis and truck body to move the latter about said pivot in a dumping action,
(d) a source of hydraulic fluid under pressure,
(e) a control unit having a main body portion,
(f) valve means controlling delivery of said fluid under pressure to said fluid and distribution unit,
(g) a passageway within the body portion for receiving fluid under pressure and two feed passageways for delivering said fluid to the two hydraulic jacks, each such feed passageway having two pairs of by-passing passageways adapted for interconnecting said feed passageways and fluid receiving passageway, each by-passing passageway having a check valve, and one such pair of by-passing passageways passing fluid forwardly and one passing fluid in a reverse direction,
(h) a transverse passageway communicating with both said feed passageways,
(i) a spring-pressed actuating rod with a piston in said transverse passageway movable in one direction by fluid passing forwardly to condition the control unit to equalize jack travel during a pressure stroke when the body is raised to dump it, and movable in the opposite direction by fluid passing in a reverse direction to equalize jack travel during a return stroke of the jacks as the body is lowered,
(j) a forward and reverse control passageway transverse of the feed passageways and intercepting them,
(k) a forward and reverse slide valve partly under the control of the actuating rod for controlling delivery of fluid to one of said pairs of by-passing passageways to permit flow of fluid through said pairs of by-passing passageways in either a forward or reverse direction,
(l) a transverse control passageway intercepting the feed passageways,
(m) a slide valve in such control passageway slidable longitudinally to close either of said feed passageways,
(n) armature operated means responsive to non-uniform longitudinal movement of the hydraulic jacks for delivering hydraulic fluid to said slide valve in a direction to discontinue fluid delivery to one of the hydraulic jacks until the non-uniformity has been relieved, operation of said actuating rod causing system modification such that actuation of the control means are reversed during reverse movement of hydraulic fluid through said passageways, and
(o) an electric circuit including a solenoid means positioning said armature in either of two functioning positions, switch means operated by said actuating rod, and means normally biasing said armature to neutral position, said actuating rod moved in response to direction of flow of said fluid automatically conditioning said circuit to forward or reverse fluid control.

12. In a dump truck combination,
(a) a truck chassis,
(b) a tilting body pivotally secured on said chassis,
(c) a pair of hydraulic jacks connected between the chassis and truck body to move the latter about said pivot in a dumping action,
(d) a source of hydraulic fluid under pressure,
(e) a control unit having a main body portion with an upper round projection thereon and a cap housing surrounding said projection,
(f) valve means controlling delivery of said fluid under pressure to said fluid and distribution unit,
(g) a passageway for receiving fluid under pressure and two interconnected feed passageways for delivering said fluid to the two hydraulic jacks, said feed passageways each having a pair of by-passing passageways each provided with a check valve, one pair of by-passing passageways functioning to pass fluid from the pressure source to said jacks during forward movement and to pass fluid from the jacks to the source during reverse movement,
(h) a transverse passageway communicating with said receiving passageway and said feed passageways,
(i) a switch actuating rod in said transverse passageway having two projecting ends,
(j) a pair of microswitches having actuating arms adapted to be engaged by the rod,
(k) a piston on the rod intermediate its ends moving said rod in a direction to disengage the switches when fluid is moving in a forward direction and to engage the switches when the fluid is moving in a reverse direction,
(l) a pivoted bell crank lever engaged by said actuating rod,
(m) a forward and reverse control passageway transverse of the feed passageways and intercepting them,
(n) a forward and reverse slide valve for controlling delivery of fluid to said pairs of by-passing passageways, said forward and reverse slide valve being controlled by movement of the said actuating rod and bell crank lever to control flow of fluid in said pairs of by-passing sections,
(o) a transverse control passageway intercepting the feed passageways,
(p) a free slide valve in such control passageway slidable longitudinally in response to control fluid to close either of said feed passageways,
(q) a hydraulic control valve including a valve stem provided with two oppositely placed valve recesses rotatably positioned in a vertical central opening,
(r) four vertical passageways equally spaced around the valve stem opening,
(s) four radial passageways communicating with said four vertical passageways and with the valve stem opening,
(t) a control fluid passageway between the feed passageways and one of said vertical passageways,
(u) a passageway between one end of the transverse control passageway and a second vertical passageway, (v) a passageway between an opposite end of the control passageway and another vertical passageway,
(w) a bleeder passageway connected to the fourth vertical passageway, the said valve thereby functioning to deliver control fluid under pressure to either end of the control passageway and bleed fluid from the opposite end,
(x) an armature secured to the valve stem,
(y) two pairs of electromagnets in functional relation with the armature to move the same to either of two positions, and
(z) electromagnetic means responsive to non-uniform movement of the hydraulic motors, and including said microswitches, electromagnets and armature, for moving said hydraulic control valve in a direction to discontinue fluid delivery to one of the hydraulic motors until the imbalance has been relieved, operation of said microswitches causing a circuit modification that actuation of the control means are reversed during reverse movement of hydraulic fluid through said feed passageways, whereby fluid is automatically delivered to a low jack on a pressure stroke should an imbalance occur as the truck body is raised in a dumping action, and fluid is drained from a high jack on downward movement of the truck body.

References Cited by the Examiner

UNITED STATES PATENTS

| | | | |
|---|---|---|---|
| Re. 20,812 | 7/1938 | Wood | 298—22 |
| 2,113,044 | 4/1938 | Eisenberg | 298—22 |
| 2,142,089 | 1/1939 | Barrett | 298—22 |
| 2,359,961 | 10/1944 | Anthony | 298—22 |
| 2,487,402 | 11/1949 | Watson | 60—97 |
| 2,731,293 | 1/1956 | Hutchinson | 298—22 |
| 2,759,330 | 8/1956 | Van Broekhoven et al. | 60—97 |
| 2,764,869 | 10/1956 | Scherr | 298—22 |
| 2,856,232 | 10/1958 | Mentes | 298—17.7 |
| 2,894,785 | 7/1959 | Yackel | 298—22 |

FOREIGN PATENTS

| | | |
|---|---|---|
| 86,314 | 10/1958 | Denmark. |
| 759,126 | 11/1953 | Germany. |
| 422,533 | 1/1935 | Great Britain. |

ARTHUR L. LA POINT, *Primary Examiner.*

JAMES S. SHANK, LEO QUACKENBUSH, MILTON BUCHLER, *Examiners.*

G. F. ABRAHAM, H. BELTRAN, *Assistant Examiners.*